United States Patent [19]
Fellows et al.

[11] Patent Number: 5,766,105
[45] Date of Patent: Jun. 16, 1998

[54] CONTINUOUSLY VARIABLE TRANSMISSION CAPABLE OF TORQUE CONTROL

[75] Inventors: Thomas George Fellows, Headington; Christopher John Greenwood, Preston, both of England

[73] Assignee: Torotrak (Development) Limited, London, England

[21] Appl. No.: 663,052

[22] PCT Filed: Dec. 9, 1994

[86] PCT No.: PCT/GB94/02705

§ 371 Date: Jun. 13, 1996

§ 102(e) Date: Jun. 13, 1996

[87] PCT Pub. No.: WO95/17621

PCT Pub. Date: Jun. 29, 1995

[30] Foreign Application Priority Data

Dec. 20, 1993 [GB] United Kingdom ............... 9325953
Jun. 2, 1994 [GB] United Kingdom ............... 9411005
Aug. 26, 1994 [GB] United Kingdom ............... 9417242

[51] Int. Cl.$^6$ ............... F16H 59/00; F16H 61/00; F16H 63/00
[52] U.S. Cl. ............... 474/18; 474/17; 474/28; 474/29; 474/32; 474/35
[58] Field of Search ............... 474/17, 18, 28, 474/29, 32, 35; 475/210, 211

[56] References Cited

U.S. PATENT DOCUMENTS 5,173,084 12/1992 Lemieux .
5,184,981 2/1993 Wittke .
5,217,412 6/1993 Indlekoer et al. .

FOREIGN PATENT DOCUMENTS

| 0232979 | 8/1987 | European Pat. Off. . |
| 0444086 | 11/1989 | European Pat. Off. . |
| 4036683 | 11/1990 | Germany . |
| 2092685 | 8/1982 | United Kingdom . |
| WO91/07613 | 5/1991 | WIPO . |
| WO93/21031 | 10/1993 | WIPO . |

OTHER PUBLICATIONS

Patent Abstracts of Japan vol. 13 No. 340 (M-857), 31 Jul. 1989 & JP.A. 01 116365 (Daihatsu Motor Co Ltd).
Paper 73003, Entitled Design Equations for a Speed and Torque Controlled Variable Ratio V-Belt Transmission.

*Primary Examiner*—Tamara L. Graysay
*Assistant Examiner*—Gary S. Hartman
*Attorney, Agent, or Firm*—Davis and Bujold

[57] ABSTRACT

A continuously-variable-ratio transmission ("CVT") of the band-and-sheave type capable of "torque control", so that what the operator demands, by movement of the accelerator pedal or other control member, is a particular driving torque applied to the ratio-varying components ("variator") A connection (21, 22) between at least one of the variator sheaves (3, 4) and its shaft (5) is torque-sensitive, so that torque at that sheave generates an axial force which is a function of the magnitude and direction of the torque to which the sheave is subjected. Examples are described in which the operating axial load, applied to the variator pulley units, comprises two parts—a first part to maintain traction between sheaves and band, and a second part related to the applied torque—and a variator using more than one band.

24 Claims, 9 Drawing Sheets

PRIOR ART

CONTINUOUSLY VARIABLE TRANSMISSION CAPABLE OF TORQUE CONTROL

This invention relates generally to continuously-variable-ratio transmissions ("CVT's"), and particularly to the ratio-varying components ("variators") of CVT's of the band-and-sheave type. In this type of CVT a continuous, flexible and substantially inelastic band, usually in the general form of a belt or chain, passes over two pulley units running on parallel but separated axes, and in a common radial plane relative to those two axes. The width of the band does not vary, and the two sheaves of each pulley unit are coaxial, but the axial clearance between them can be varied, so varying the radius at which the band runs in contact with the pulley unit. If the sheaves of a first of the two units move axially apart, whereby reducing the radius of contact of the band, the sheaves of the second unit must approach in order to increase the radius and so maintain tension in the band. At the same time, if the first and second units are regarded respectively as the input and output members of the variator, the transmitted ratio falls. Conversely, if the sheaves of the first unit had moved axially together and those of the second apart, the ratio would have risen. At all times during operation the sheaves of both units must of course be urged axially together with a force sufficient to generate enough pulley/belt friction to transmit the required traction between them. Typically, one sheave of each pulley unit has been fixed to its shaft Awhile the other has been slidably connected to the shaft by axial splines, and the face of that sheave remote from the belt has formed the face of a piston moving within a cylinder connected to a source of fluid under hydraulic pressure which has generated the required axial load. It will be apparent that if one sheave of each pulley unit is fixed and the other axially movable, as just described, any ratio change must be accompanied by a slight axial shift of the belt relative of each pulley unit. Means for avoiding any adverse effects of this are well known to one skilled in the art, including axially-reversing the arrangement of the two sheaves—fixed and movable—between the two pulley units, so that the direction of the axial shift of the belt at the unit where the sheaves approach is matched by the corresponding belt shift at the other unit where the sheaves move apart.

In known variators of this kind it has been customary for the operator to change the transmitted ratio by what has become known in the art as "ratio control", that is to say a direct command on the hydraulic controls of the two movable sheaves to cause those of one unit to execute a predetermined movement apart and those of the other to execute a related predetermined movement together, while maintaining sufficient axial loading at both pulley units to maintain the necessary belt/sheave friction. In contrast, recent developments in the related technical field of CVT's of the toroidal-race rolling-traction type have demonstrated the advantages of so-called "torque control", where what the operator demands, by movement of the accelerator pedal or other control member, is a particular driving torque applied to the variator either by way of the driving shaft (i.e. torque load on the engine), or by way of a particular output torque on the driven shaft. Examples of a CVT control system of this type, and of a toroidal-race CVT well-suited to such control, are to be found in patent publications WO 93/21031 and EP-B-0444086 respectively.

Occasional proposals have been made to include some element of torque control in a CVT where the variator is of band-and-sheave type. One such proposal appears in Paper 730003, entitled "Design Equations for a Speed and Torque Controlled Variable Ratio V-Belt Transmission", presented at the International Automotive Engineering Congress and Exposition in Detroit, Mich. in Jan. 1973. In the variator described in that proposal one of the two pulley units exhibits some torque-sensitive capacity due to the capacity of one of the sheaves to move spirally relative to the shaft on which it is mounted, while the other pulley unit is sensitive not to torque but to input speed. The Paper proposes using such a CVT in certain specialised vehicles such as snowmobiles. It should however be noted that while the control movements of the operator of such a vehicle would undoubtedly be directly related—by way of the accelerator pedal—with movements of the vehicle throttle, the Paper contains no teaching that the relative movements of the sheaves of the two pulley units should be directly controlled by or related to the control movements of the operator. The result is a CVT of limited controllability, because for any output load—that is to say, the product of output speed and output torque—there is, within the ratio limits of the variator, just a single equilibrium combination of input speed and input torque. A CVT with such limited controllability does not match the needs of a modem road vehicle. Another limitation of a variator as described in the Paper is that it is unsuitable for use in the kind of CVT, now increasingly necessary for practical automotive applications, where the operating range is extended by providing for it to work in more than one so-called "regime" in each of which the variator progresses from one end of its ratio range to the other. In such multi-regime designs it is customary for power to be recirculated through the variator in one of those regimes, during which the variator output and the power input act as two inputs to an epicyclic and at a particular ratio value a so-called "geared neutral" condition is achieved when all the transmitted power is recirculated, so that the transmission output and therefore the automobile is stationary. It is a practical necessity in most automotive transmissions that include such a recirculatory regime, that the variator seeks geared neutral when, for example, the engine is started and reaches idling speed while the vehicle is still at rest. The Paper does not teach the possibility of a power-recirculation regime in which geared neutral is achievable, and in the absence of driver demand the described variator simply seeks one extreme of its ratio range.

A CVT according to the present invention is also to be distinguished from the kind shown in Specification U.S. Pat. No. 5,217,412. As stated many times in that specification, it relates to a CVT in which the operator demands a particular ratio of the variator, and changes in torque will have no direct effect on that ratio. With the present invention there is no direct control of ratio: by the magnitude of his actuation of the accelerator pedal or other control member the operator demands a particular torque on one or other variator shaft and, within operating limits, that torque will be held even if the ratio changes. Another distinction from U.S. Pat. No. 5,217,412 is that for efficient "torque control" it is desirable for the connection between at least one of the pulley units and its shaft to generate a force dependent on the torque on the shaft in both magnitude and direction: this force acts so as to tend to vary the axial separation of the sheaves. In U.S. Pat. No. 5,217,412 the only torque-sensitive connection (item 24) is between two sections of the shaft of one of the pulleys. When it operates so as to sense torque, no directly-related axial force is generated and applied to induce relative movement of the pulley sheaves.

A feature, applicable generally to belt-type CVT's that are capable of "torque control", is that wherever there is a torque-sensitive connection between a pulley unit and its shaft, so as to permit pulley-shaft movement and generate a pulley-shaft force which is a function of the magnitude and direction of that torque, then whenever that shaft is transmitting torque to the belt the reaction at the connection generates a force tending to separate the sheaves, and whenever that shaft is receiving torque from the belt the corresponding force tends to move the sheaves together. The subject matter of the present invention is thus to be distinguished also from the belt-type CVT shown in Specification U.S. Pat. No. 5,173,084, where there is a potentially torque-sensitive connection between each pulley unit and its shaft. In U.S. Pat. No. 5,173,084 however the operation of the two potentially torque-sensitive connections between the pulley units and their respective shafts is different. The torque-related forces generated at these two connections act in unison on both pulley units, tending either to move both of them together whenever power flows from the input shaft (12) to the output shaft (14) or both apart when the power flows is reversed. As is explained clearly in the specification, for example in col. 5 lines 23–32, this is done in order to simplify and/or reduce the capacity of the hydraulic pumps. Torque control is not achieved by the CVT's described in that specification, nor does it teach the possibility—let alone the advantages—of torque control in any way. It should also be noted particularly that the operation of the torque-sensitive connections described in U.S. Pat. No. 5,173,084, like those of Paper 730003 already mentioned, would prevent them from being used in a multiregime CVT where the variator is required in certain circumstances—for intance when idling—to seek geared neutral.

The present invention arises from appreciating how a CVT of the band-and-sheave type may be improved by becoming torque-controllable to the degree that it is required by a modern automotive vehicle, and that is more comparable with the controllability of the toroidal-race CVT's already mentioned.

The invention is defined by the claims the contents of which are to be read as included within the disclosure of the specification and includes CVT's as will now be described by way of example with reference to the accompanying drawings, parts of which are diagrammatic and schematic, and in which.

Throughout the description of the drawings items with generally similar function may, where the context allows, be referred to by the same reference numeral.

Figure 1:
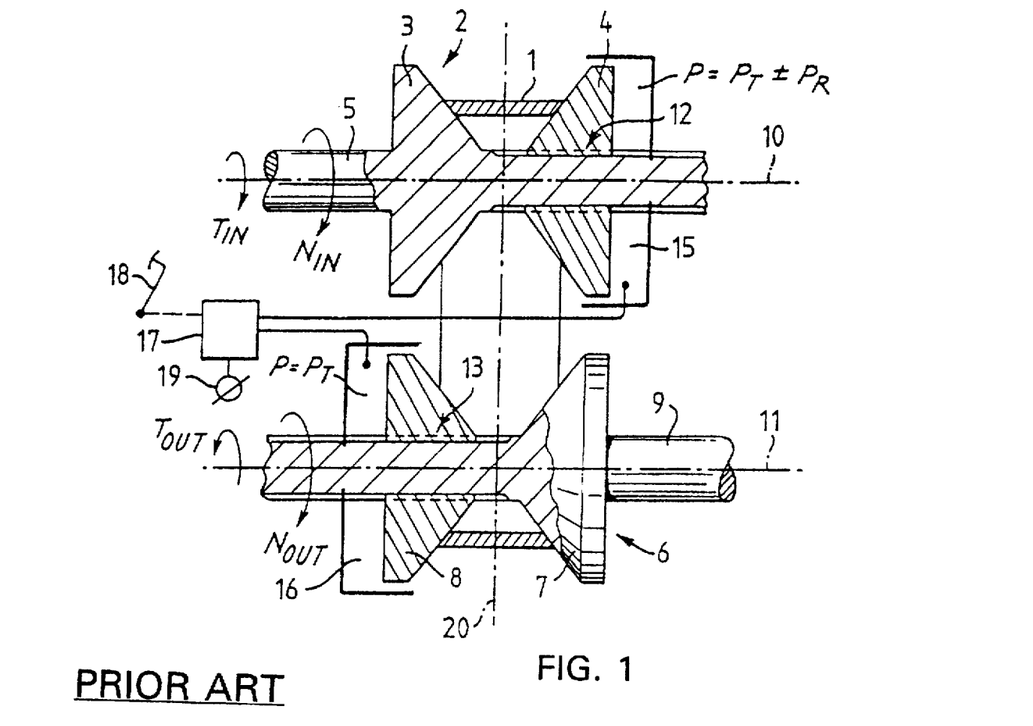
FIG. 1 is an axial section through components of a known belt-and-sheave variator.

FIG. 1 shows a variator in which a belt or chain 1, flexible but inextensible and of unvarying width, transmits traction between a first pulley unit 2 comprising sheaves 3 and 4 and a shaft 5, and a second pulley unit 6 comprising sheaves 7 and 8 and a shaft 9. Shafts 5 and 9 are rotatable about separated but parallel axes 10 and 11 respectively.

Sheaves 3 and 7 are fixed to their respective shafts, but sheave 4 is axially-splined to shaft 5 at 12 and so is capable of some relative axial movement. Sheave 8 is similarly splined to shaft 9 at 13. The sheaves 4 and 8 act as pistons movable within hydraulic cylinders 15 and 16 respectively, the cylinders being connected by way of a control unit 17 both to a control member 18 and to a source 19 of hydraulic power.

Assuming shafts 5 and 9 are respectively the input and output members of the variator the arrows $T_{IN}$, $N_{IN}$, $T_{OUT}$ and represent respectively the input torque, input speed, output torque and output speed of the variator. Control unit 17 will operate so as to generate a hydraulic pressure $P_T$ in cylinder 16, sufficient to maintain belt tension, and $P_T \pm P_R$ in cylinder 15, where $P_R$ is an increment dependent on the depression of pedal 18 and operable if positive to cause sheaves 3, 4 to approach and so raise the transmitted ratio, or if negative to cause them to move apart and to lower it. However with sheaves 3 and 7 fixed to their respective shafts 5 and 9, and sheaves 4 and 8 mounted on those shafts only with limited freedom for axial movement, there is no way in the absence of hydraulic pressure in which any of the sheaves can move automatically, to change ratio, in response to a change in the torque transmitted across the variator. It is therefore as it stands unsuitable for a CVT—of one, two or more regimes—in which recirculation takes place in at least one of those regimes. In such a variator it is also not easy, because the variator does not sense torque, to estimate the optimum value of the pressure $P_T$ which should, for life and efficiency, be the lowest consistent with no belt slip.

With each change of command from control 17, $P_R$ changes as pulley unit 2 opens or closes, unit 6 does the reverse, so ensuring—through the opposite-hand arrangement of cylinders 15 and 16—that the centre line 20 of belt 1 stays substantially in the same radial plane relative to shafts 5 and 9.

Figure 2:
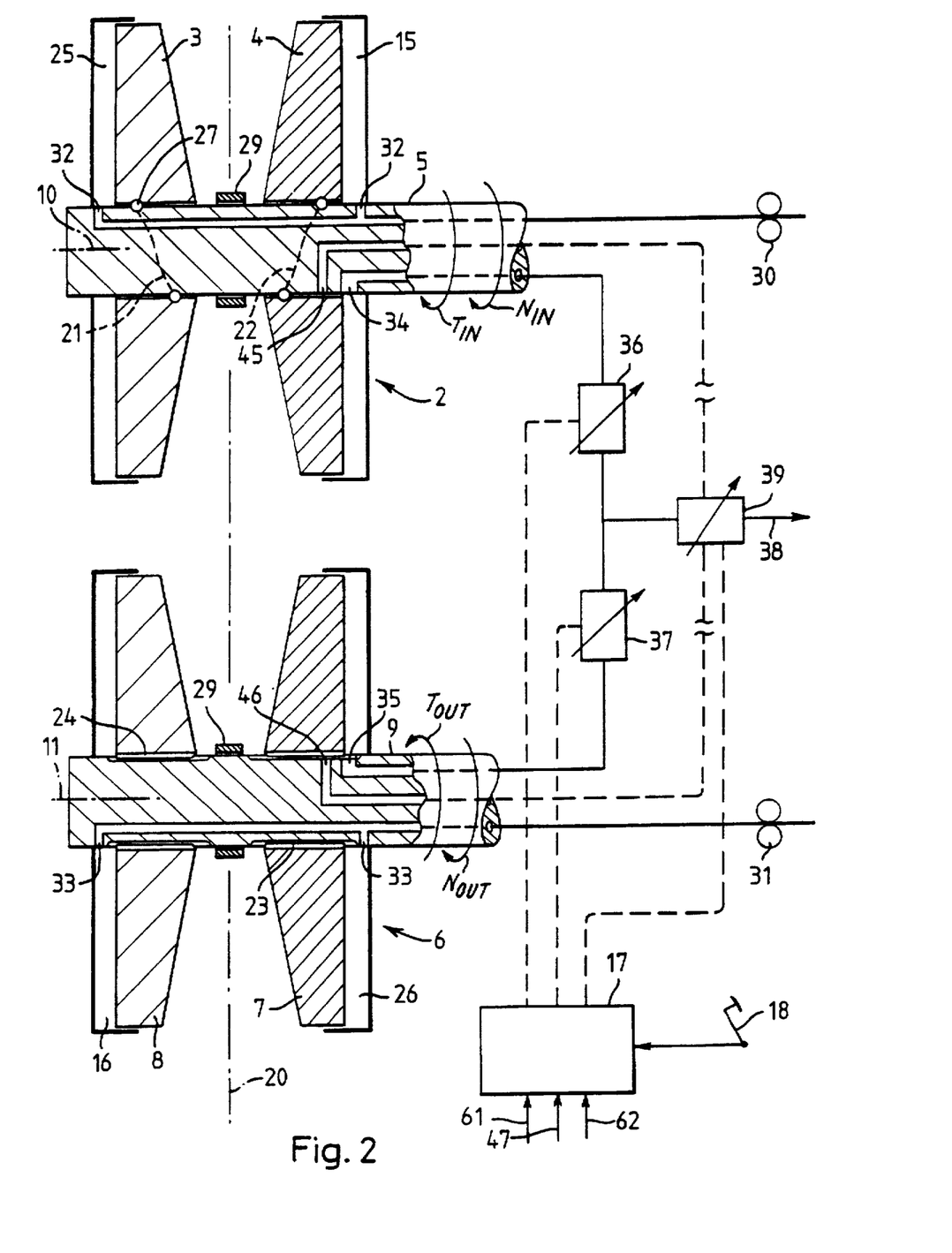
FIG. 2 is a similar view through a variator according to the present invention, in association with components of a hydraulic control circuit.

In the corresponding variator according to the invention, shows in FIG. 2, sheaves 3 and 4 of unit 2 are both movably mounted on shaft 5 by means of helical splines 21, 22 respectively, these splines being of opposite hand, but sheaves 7 and 8 of unit 6 are mounted on shaft 9 by means of axial splines 23 and 24. Sheaves 3 and 7 are mounted as pistons movable within cylinders 25 and 26, and the cavities of cylinders 15 and 25 are in communication and therefore at equal hydraulic pressure, as are those of cylinders 16 and 26. The helical engagement between sheaves 3, 4 and their shafts 5 may in practice be by way of ball races, and reference 27 indicates the balls. The "hands" of the helices 21, 22 must be chosen to match the directions of rotation indicated by the arrows $N_{IN}$ and $N_{OUT}$, so that any torque transmitted between the sheave and the belt gives rise to a proportional axial force on both sheave and shaft, and any applied torque will result in a ratio change to reduce the torque. Control of the variator will be effected, as in FIG. 1, by operating member 18 by way of hydraulic control unit 17, but now separate pumps 30, 31 supply hydraulic fluid to the two pulley units 2 and 6. Pump 30 supplies fluid to the cylinders 15 and 25 of unit 2 by way of inlet ports 32 and pump 31 supplies fluid to the cylinders 16 and 26 of unit 6 by way of inlet ports 33. Fluid then leaves the cylinders of units 2 and 6 by way of outlet ports 34, 35 respectively, and thence by way of control valves 36, 37 to drain 38. The main function of a further variable-resistance valve 39, located between valves 36, 37 and drain 38 and also controlled from unit 17, is to set a "base value" $P_T$ for the pressure in the cylinders that is sufficient at all times, while traction is being transmitted, to maintain sufficient grip between the sheaves and the belt. Now, whenever driving conditions are such that power flows from unit 2 to unit 6, unit 17 regulates valve 36, but causes valve 37 to open. Base pressure $P_T$ is therefore established in cylinders 16 and 26, and in the cylinders 15 and 25 of unit 2 a pressure of $P_T+P_C$, where $P_C$ is a function of the transmitted torque which the operator is demanding (by way of pedal 18) and matches the outward axial thrust which the sheaves 3, 4 will be exerting in response to that demanded torque. If the transmission is subject to torque in the reverse direction, unit 17 controls valve 37 and opens 36, so that base pressure $P_T$ is established in cylinders 15, 25 and $P_T$ plus $P_C$ in cylinders 16, 26 of unit 6. This control of the quantity $P_C$ means that the axial loading forces upon the two pulley units are directly responsive to operator demand, and their magnitude can be represented as a predetermined function of the magnitude of that demand.

Figure 4:
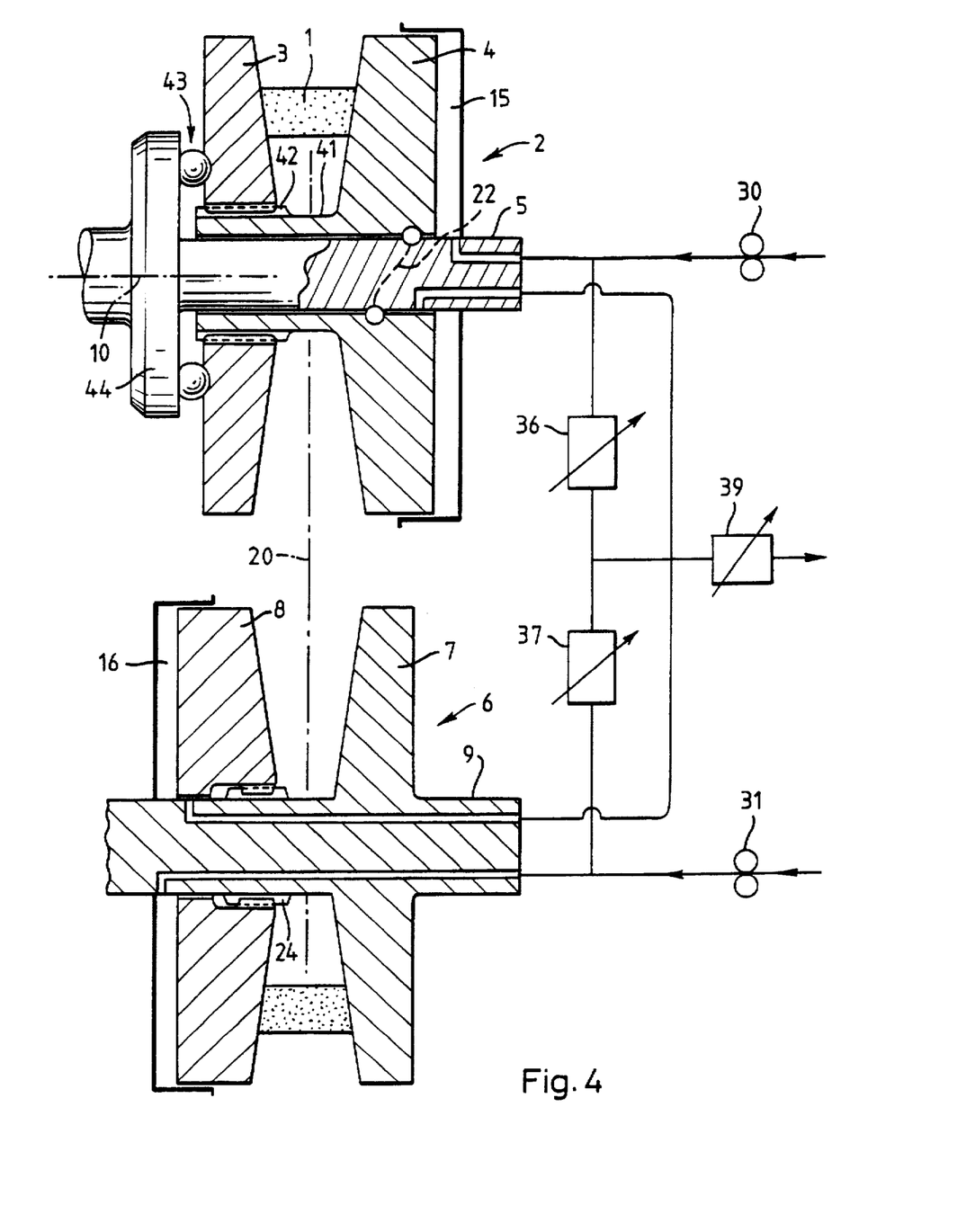
FIG. 4 is similar to FIG. 2 but shows an alternative variator.

In the variant of the invention shown in FIG. 4, sheave 4 of unit 2 is mounted on helical ball screw 22 and works within cylinder 15 as before, but sheave 3 is mounted on an axial spline 42 carried on a collar 41 integral with sheave 4. Sheaves 3 and 4 therefore rotate together but are capable of limited relative axial movement, and a thrust race 43, carried by a flange 44 integral with shaft 5, fixes the relative axial positions of that shaft and the sheave 4. In unit 6 sheave 8 is mounted on straight splines 24 and moves as a piston within cylinder 16 as before, but sheave 7 is now simply fast with shaft 9. The single ball screw 22 now takes the torque from both sheaves of unit 2, because the axial spline 41 takes the torque from sheave 3 to sheave 4 and thence, through the screw 22, to the shaft 5. As in FIG. 1, the opposite-hand arrangement of cylinders 15 and 16 ensures that as the sheaves of one of units 2, 6 move apart while those of the other move together, and vice versa, the plane of the centre line 20 of belt 1 remains substantially constant.

In practice it is also likely to be desirable to ensure that any mismatch, that should occur for any reason in operation, between the ideal clamping force on the belt and the pressures in cylinders 15, 25 and 16, 26 is avoided, especially towards limits of the ratio range when the belt is close to its maximum or minimum radius on either pulley unit. While not identical in effect, aspects of such a feature of a CVT according to the present invention can be compared with the "hydraulic end stop" features for toroidal-race rolling-traction CVT's described for example in Patent Specifications GB-B-2023753, EP-B-0133330 and EP-B-0444086. In FIG. 2 the location and size of outlet ports 34 and 35 and the provision of further ports 45 and 46, contribute to the generation of such an "end stop" effect, although it will be understood that other features not shows would in practice be required also to ensure that the timing and magnitude of the effect was suitable. In pulley unit 2 the outlet port 34 is so sized and located, relative to cylinder 15, that if sheaves 3 and 4 tend to separate axially beyond a predetermined limit, sheave 4 will eventually totally cover port 34, blocking off the common fluid outlet of the two connected cylinders 25 and 15, so that the pressure in these two cylinders will rise to that of the pump 30 and so resist further separation of the sheaves. Conversely, should the sheaves approach each other closer than has been predetermined, port 45 will be uncovered. This port communicates, directly or indirectly, with drain 38 by way of valve 39, but in a manner by-passing control valve 36. This therefore relieves the pressure in cylinders 15, 25 and inhibits further approach of the sheaves. In pulley unit 6, the location and sizing of port 35 and the provision of port 46 will work to similar effect.

It will be appreciated that the operation of such a "hydraulic end stop" mechanism may in practice not only achieve the purpose of preventing the sheave/belt clamping force from rising too high or falling too low at each pulley unit, but also have the related effect of tending to keep the belt/sheave radius of contact within predetermined limits. To this latter end, FIG. 2 also shows further and purely mechanical "end stops" in the form of rings 29, mounted to rotate about shafts 5, 9 between the sheaves of units 2 and 6, which physically prevent the belt 1 from making contact with either shaft, for example should the hydraulic stops have failed to act to prevent the sheaves from separating far enough to allow it to do so. There would be less need for such rings in the variant shoe n in FIG. 4, where the collar 41 of unit 2 and the shaft 9 of FIG. 6 rotate in unison with sheaves 3, 4 and 7, 8 respectively. Many other forms of physical stops, to prevent the sheaves from separating or approaching beyond chosen limits, are of course possible.

Figure 3:
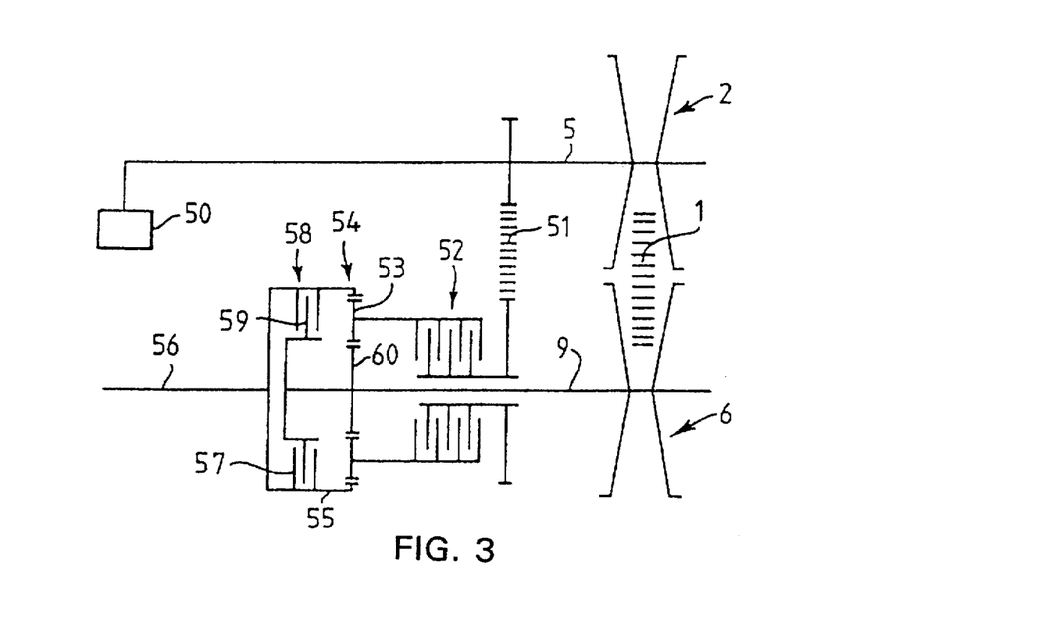
FIG. 3 shows some essential components of a two-regime CVT using a variator as in FIG. 2.

FIG. 3 shows the essential components of a two-regime CVT in which a prime mover 50 drives the shaft 5 of pulley unit 2 (as shown in FIG. 2) at speed $N_1$ and also, by way of a fixed-ratio belt 51 which reduces the drive speed to ½. $N_1$, one half of a low regime clutch 52. The other half of this clutch is connected to the planet carrier 53 of an epicyclic 54, the ring gear 55 of which is connected both to the CVT output member 56 and also to one half 57 of a high regime clutch 58. The other half 59 of this clutch, and the sun gear 60 of epicyclic 54, are both connected to the output shaft 9 of the variator, that is to say to the common shaft of sheaves 7 and 8.

To illustrate the operation of a vehicle including the CVT of FIGS. 2 and 3, a sequence of events will now be described starting from rest. The operator will be able to control the vehicle driveline with a typical gear selector lever (having an input to unit 17 indicated schematically at 47) including at least the standard N, P, D and R settings.

When engine 50 starts, with the gear selector in "N" or "P" clutches 52 and 58 will both be disengaged. On selecting "D" clutch 52 will start to engage. If the vehicle is stationary and the variator is not in the ratio known in the art as "geared neutral" (i.e. the ratio which for finite rotation of input shaft 5 generates zero rotation of output member 56) a drag torque will be imposed on the variator by clutch 52. Until the accelerator pedal 18 is depressed to move off, both of the control valves 37 and 36 will be open and there will be no differential pressure on the two pulley units 2, 6. There will however, typically, be a "base" pressure provided by valve 39 as already described.

Assume epicyclic 54 has a ratio E=2, and belt 51 has a fixed ratio of ½ as already described. With the vehicle stationary, belt 51 will try to drive the variator output shaft 9, through clutch 52 and epicyclic 54, at a speed of ½. $N_1$. Shaft 9 may actually be running at, say, ½. $N_1$ and, if so, will try to accelerate both itself and the variator input shaft 2. The accelerating torque on the latter will generate, through the action of the helical ball races 21, 22 axial forces driving the two sheaves 3, 4 of pulley unit 2 together, thus raising the transmitted ratio. The forces will not be resisted because there is, as yet, no differential pressure on pulley units 2 and 6.

Should the ratio overshoot, the torque on input shaft 5 will be reversed and the axial forces will drive sheaves 3, 4 apart. So, without any external control, this torque-sensitive variator will find the correct ratio to adopt before the vehicle moves away from rest in its low regime, that is to say the regime in which clutch 52 is engaged, clutch 58 is disengaged, and power recirculates through the variator.

When pedal 18 is now depressed, control unit 17 registers a demand and, with knowledge of the regime and the current ratio (by way of inputs shown schematically at 61 and 62), interprets this demand as an output torque or a torque load on the engine. To move forward in low regime, the variator ratio must reduce from ½ towards ½. Therefore power flows from unit 6 to unit 2, and the sheaves 7, 8 on output shaft 9 must move towards each other. This is effected by the control unit opening valve 36, and raising the pressure in communicating cylinders 16, 26 by increasing the variable resistance in valve 37.

The axial load on the sheaves 7, 8 will now be given by the aggregate of the clamping pressure (generated by valve 39) and the differential pressure generated by torque control valve 37. The axial load on the sheaves 3, 4 on shaft 5 will be given by the same clamping pressure ($P_T$) and the force from the helix. As the angles of the conical faces of all the sheaves are equal it follows that, when the force created by the differential (i.e. torque control) pressure balances that of the helix, the variator ratio will be stable. Since the axial force from the helix is a function of the variator input torque, the differential pressure must itself be a direct function of that torque, whether the torque-controlling pressure is applied to pulley unit 2 through valve 36, or to unit 6 through valve 37. The differential pressure is of course also a function of the variator "output" torque, modulated by the instantaneous variator ratio.

If conditions permit, the differential pressure will take the variator to the lower limit of its ratio, ½. Then unit 17 will cause low regime clutch 52 to disengage and high regime clutch 58 simultaneously to engage, the variator and epicyclic ratios having been chosen so that this change is of the kind known in the art as "synchronous" and causing no instantaneous change of rotary speed of output member 56. With clutch 58 engaged, and the transmission therefore in "high regime", further depression by the operator of pedal 18 will cause the variator to proceed back over its entire ratio range, from ½ where it presently stands to its maximum of 2. During this regime, whenever power is to be drawn from the prime mover 50, the torque load will be determined by pressure control valve 36.

The function of valve 39 in setting a basic "clamping force", between the sheaves and the belt has already been referred to. It should be noted that the useful power-transmitting force between the sheaves and the belt is a tangential one, and that there is an upper limit to the fraction of the axial clamping force, as determined by valve 39, that the tangential force can be without slip. That limit is determined by the coefficient of friction between the sheaves and the belt. Conversely, an excessive clamping force will reduce both life and efficiency. When the CVT is regulated by torque control it is easy to calculate the tangential force at any ratio, and therefore the optimum clamping force. The ratio is simply measured, and the unit 17 receives the electrical input of that measurement at 62. The tangential force is a function of torque, divided by the radius of contact between belt and sheave, and that radius is itself a function of ratio. The input to valve 39 from unit 17 programmes the valve to adjust the hydraulic pressure in cylinders 15, 25 and 16, 26 so as to seek this optimum force.

Figure 5:
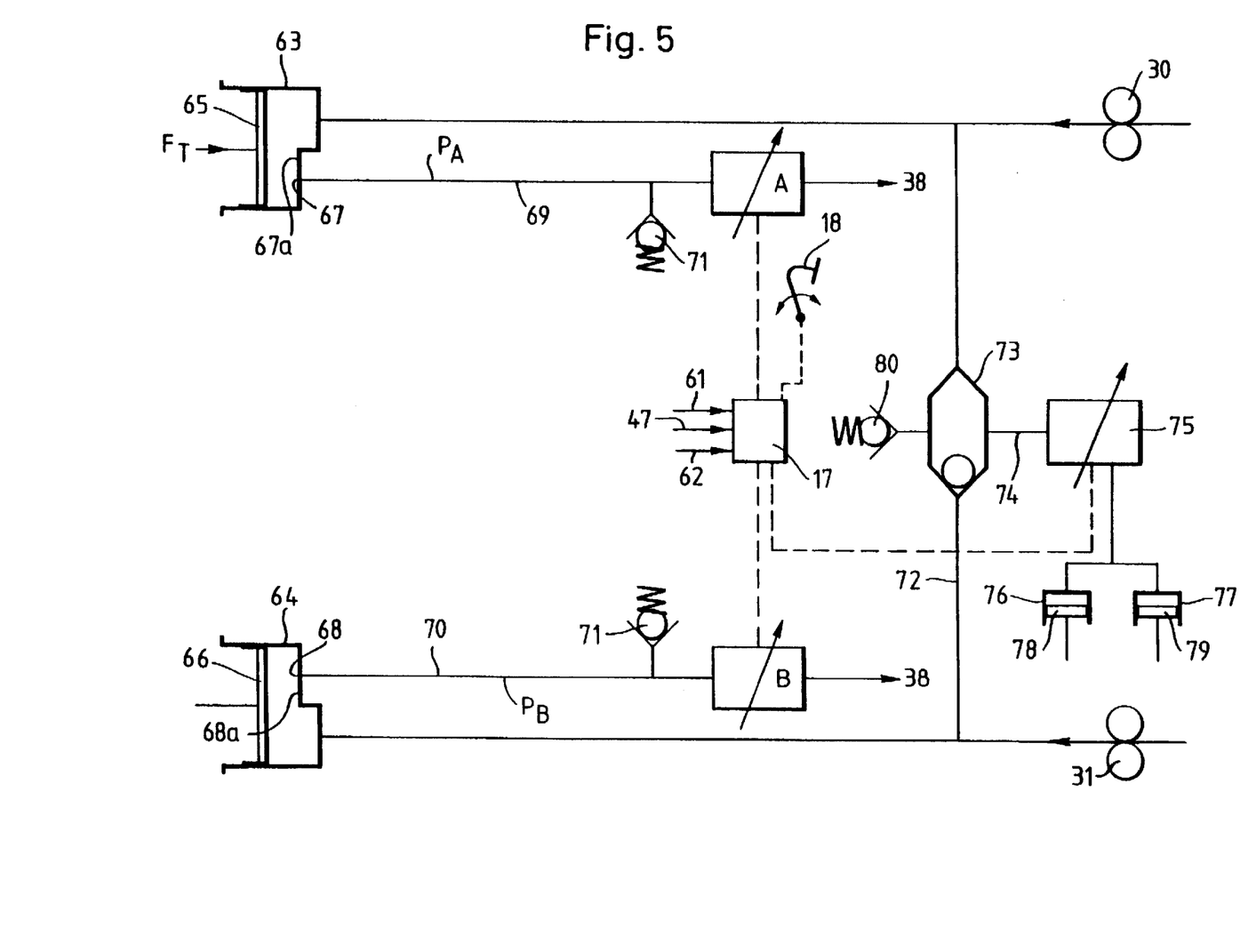
FIG. 5 is a hydraulic circuit drawing.

In FIG. 5 the pumps 30 and 31 deliver fluid to cylinders 63, 64 containing pistons 65, 66. In normal operation the return lines for fluid from these cylinders to drain 38 are by way of outlets 67 and 68, lines 69 and 70 and control valves A and B respectively, the pressures in lines 69 and 70 being $P_A$ and $P_B$ respectively. Relief valves 71 are provided to prevent either of pressures $P_A$, $P_B$ rising above a predetermined value. In a torque-controlled CVT of the toroidal-race rolling-traction type, as described for instance in Patent Specification EP-B-0444086, items 65 and 66 would correlate with opposite faces of a double acting hydraulic piston, connected to the carriage of one of the rollers, the orientation of which changes to vary the transmitted ratio. In the variator of a torque-sensitive CVT of the belt-and-sheave type, as shown for instance in previous Figures, cylinders 63 and 64 would typically be associated respectively with each of the two pulley units 2 and 6 of the variator, and the pressures supplied to the two units are in this example of the invention controlled so as to generate on one such unit the arithmetical sum of the desired clamping and torque related forces and, on the other, the clamping force alone. The clamping force urges the pulley sheaves into appropriately firm traction-transmitting contact with the belt and the torque related force balances, at equilibrium, the axial force from the torque-sensitive screw or similar mechanism. In this example of the invention the pressures generated by the valves A and B in cylinders 63 and 64 match only the torque-related forces. The clamping forces are generated separately, as follows. The deliveries of pumps 30, 31 are bridged by a line 72 connected to the two inlets of a valve 73 which admits only the greater for the time being of pressures $P_A$ and $P_B$, and closes off the lesser. The outlet line 74 of this valve passes, by way of a pressure-dropping valve 75, to cylinders 76, 77 arranged in parallel and containing pistons 78, 79 respectively. Piston 78 bears axially upon one sheave, and applies the clamping force to that sheave. Similarly piston 79 applies the clamping force to the other sheave, and the relationship between pistons 65, 66, 78 and 79 will be explained with reference to FIG. 6.

It will be noted firstly that because cylinders 76 and 77 are arranged in parallel downstream of valve 75, the same pressure always exists within those cylinders. This is of course appropriate because the same traction should be transmitted at both sheaves.

Secondly, any movement of piston 78 in one direction will be substantially balanced by a movement of piston 79 in the other direction, and vice versa. Thus substantially all fluid displaced from cylinder 76 will flow into cylinder 77, and vice versa, thus diminishing the need for pumps 30 and 31 to accommodate fluid flows due to the movements of the two clamping pistons 78 and 79. It should be noted also that only one of the two pumps supplies the clamping cylinders at a time. All this allows the power of the pumps to be smaller than would have been the case had cylinders 63 and 64 been required to generate both the torque-responsive and the clamping loads, as in previous FIGS.

Were fluid at the greater of the discharge pressures of pumps 30 and 31 to be supplied directly (via valve 73) to cylinders 76 and 77, the clamping forces exerted by pistons 78 and 79 would in general be too great. Valve 75 applies a pressure reduction factor substantially proportional to the instantaneous ratio of the variator, because the clamping force should be a function of the traction force on the belt which, in turn is a function of torque and the radius of contact of the belt with the sheave, i.e. a measure of ratio. The pressure from which the clamping force is obtained is proportional to torque alone and should therefore be modified by the instantaneous ratio to produce the desired clamping force. To protect the circuit against dangerous hydraulic pressure rises due to malfunction, the relief valves 71 are provided in lines 69 and 70 to safeguard the torque-responsive function and a similar valve 80, connected to valve 73, to protect the clamping function. However, in order to be "fail safe", valve 75 should be of the type that returns to fully open, so applying full pump pressure to cylinders 76 and 77, to guarantee continued traction, in the event for instance of a fault in the central control mechanism.

In normal operation control valves A and B will typically be regulated by the central programmed electronic control unit 17, receiving (by way of 61, 62 and 47) inputs indicative of vehicle and engine speed, gear selection and other relevant parameters, and in particular from the driver by way of accelerator pedal 18. The location of cylinder outlet ports 67 and 68 in raised steps (67a and 68a) formed on the end walls of their respective cylinders provides an "end-stop" effect as a safeguard against malfunction, in a way well known in the art. If the piston 65 overshoots its normal stroke and approaches the step 67a closely, the resistance of the outlet port is increased and with it the pressure of the fluid in cylinder 63, up to the maximum setting of relief valve 80, so increasing the resistance to further overshooting travel of the piston.

Figure 6:
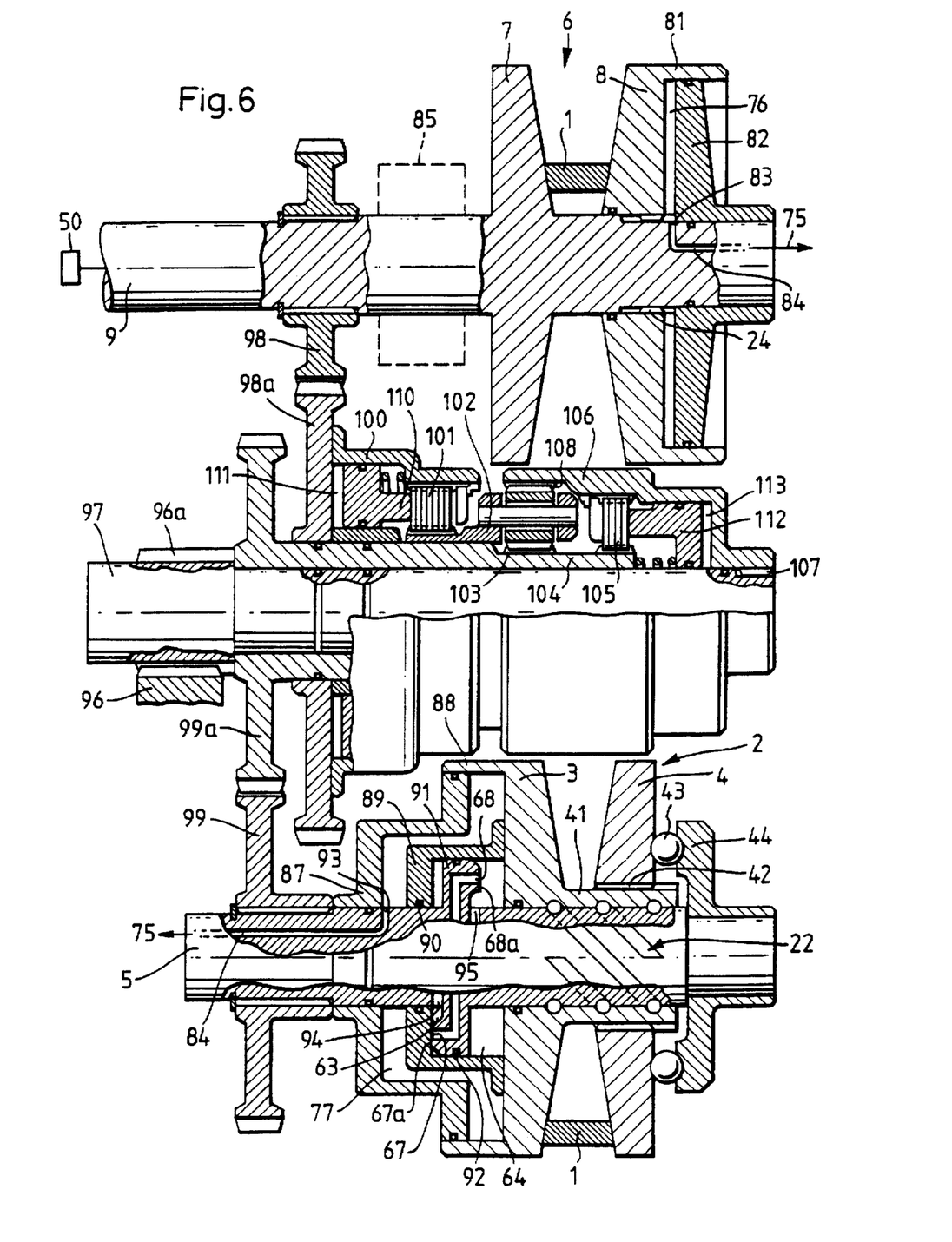
FIG. 6 is an axial section through the sheaves of a CVT using the circuit of FIG. 5.

FIG. 6 shows the CVT to which the hydraulic circuit of FIG. 5 applies. The variator includes pulley unit 6, comprising sheaves 7 and 8, and pulley unit 2 comprising sheaves 3 and 4. Belt 1 transmits drive from one pulley unit to the other. Sheave 7 is fixed to shaft 9 which in this design is driven by prime mover 50, and sheave 8 is splined to shaft 9 at 24 so that limited relative axial movement between the shaft and this sheave is possible. Sheave 8 carries a flange 81 and a variable capacity annular space is defined by the shaft 9, sheave 8, flange 81 and a circular plate 82 carried by the shaft. The clamping pressure acting on pulley unit 6 is generated in this space, which therefore corresponds with say cylinder 76 of FIG. 5 and is connected by way of an inlet port 83 and conduit 84 with the pressure-dropping valve 75.

Sheave 3 of the other pulley unit 2 is connected to shaft 5 by way of helical spline 22. The second sheave 4 of unit 2 is splined at 42 to a collar extension 41 of the first sheave 3, so that the two sheaves 3, 4 can move axially but cannot rotate relative to each other. A ball thrust race 43, supported by a flange 44 fixed to shaft 5, limits movement of sheave 4 to the right as shown in FIG. 6. As in FIG. 4 the helical spline 22 provides a bi-directional torque-sensitive connection between the pulley unit 2 and the shaft 5: the sheaves 3, 4 will tend to separate when the torque is in one rotary sense, and to converge when it is in the other.

A stepped ring 87 is fixed to shaft 5 at its inner rim, and at its outer rim makes a sealed sliding fit with a flange 88 carried by sheave 3. A smaller stepped ring 89 is fixed to sheave 3 and makes a sealed sliding fit with shaft 5 at 90. A ring 91 is carried by shaft 5, and the outer rim of this ring makes a sealed sliding fit with the inner wall of ring 89 at 92. Between them the shaft 5, sheave 3 and rings 87, 89 and 91 thus define three variable-capacity annular chambers. These chambers are referenced 77, 63 and 64 in FIG. 6, because those are the references for the features which they correspond with in FIG. 5. Chamber 77 connects by way of an inlet port 93 and conduit 84 with pressure-dropping valve 75, and provides the clamping force. Conduit 84 passes axially within shaft 5, just as it does within shaft 9. Fluid enters cylinders 63 and 64, from pumps 30 and 31 not shown in FIG. 6 by way of ports 94 and 95 respectively and leaves, also as in FIG. 5, by way of ports 67 and 68. In the design of FIG. 6, effectively the two cylinders 63, 64 are coaxial and separated by the fixed ring 91, the left-hand face of the ring 89 becomes the piston 65 and the left face of the sheave 3 becomes the piston 66. It should be noted that in FIG. 6 as in FIG. 5, the ports 67 and 68 are formed in stepped surfaces 67a, 68a respectively and thus lie axially-proud of the related inlet ports 94 and 95, so as to provide the end-stop effect already described.

In the embodiment of FIG. 6 the shaft 9 may conveniently drive a pump assembly indicated in broken lines at 85 and including the hydraulic pumps 30 and 31. The final drive gear 96 of the CVT engages with a gear 96a carried by a third shaft 97, a gear 98 mounted on shaft 9 meshes with a gear 98a coaxial with shaft 97, and a gear 99 mounted on shaft 5 meshes with a gear 99a also coaxial with shaft 97. The working range of the variator of FIG. 6 is extended by providing it with the means to work in two successive regimes, to be referred to as "low" and "high". Assuming shaft 9 rotates at constant speed typically low regime will progress from a condition in which belt 1 moves from maximum to minimum radius across pulley unit 6 (and in the opposite sense across unit 2) during which final drive gear 96 begins by rotating at maximum speed in the reverse direction, decelerates until stationary (the condition known in the art as "geared neutral") and then accelerates in the forward direction until the belt has reached minimum radius on pulley unit 6. At this point clutches (to be described) are simultaneously operated to disengage low regime and engage high, ratios and dimensions being chosen to achieve what is known in the art as a "synchronous change", involving no instantaneous change of the transmitted ratio. During high regime the belt progresses back to maximum radius on pulley unit 6 and minimum on unit 2, and final drive gear 96 continues to accelerate to its final, maximum forward speed.

To achieve these two regimes, gear 98 carries a flange 100 supporting one half of a low regime clutch 101, the other half of which carries the planet carrier 102 of an epicyclic gear unit. The sun gear 103 of this unit is mounted on a tubular extension 104 carried by gear 99a, both extension and gear being mounted rotatably about shaft 97. Extension 104 also carries one half of a high regime clutch 105, the other half of which is carried by a flange 106 which is fixed to shaft 97 at 107 and which also carries the ring gear 108 of the epicyclic unit. In low regime clutches 101 and 105 are respectively engaged and disengaged, and the epicyclic unit mixes inputs from shaft 9 (by way of planet carrier 102) and shaft 5 (by way of sun 103) to drive the ring gear and so the shaft 97 and the final drive gear 96. At the "synchronous change" point clutches 101 and 105 are respectively disengaged and engaged, after which the direct connection of shafts 9 and 97 by way of gears 98, 98a is broken, and shaft 97 is driven directly only from shaft 5 by way of gears 99 and 99a, flange 104, high regime clutch 105, and flange 106. The pistons and hydraulic cylinders used to operate clutches 101, 105 are shown at 110, 111 and 112, 113 respectively.

It may be noted that the operation of the torque-sensitive sheave-shaft connection (e.g. item 22 in the example of FIG. 6) in response to a change of demand is in effect to seek to lower the speed of the shaft through which power is being delivered (5 in this FIG.), relative to the speed of the shaft (9) through which power is being supplied to the variator. In other words, the response is such that the variator tends to seek a ratio that reduces the power delivered. Some further characteristics of the embodiment of FIG. 6 should also be noted. Firstly that the two clutches (101, 105) and the epicyclic unit are on a separate shaft (97) from the two pulley units 6 and 2. This is in order to make an axially-short transmission suitable, in particular, for installation in vehicles in which the engine is installed transversely. Secondly, it does not matter in principle which of the pulley units 2, 6 the torque-sensitive connection (22) is associated with. Thirdly, an advantage of mounting the torque-sensitive connection 22 and all the associated hydraulic ports and conduits on and within the shaft 5 is that because both ends of that shaft are potentially unobstructed, access for hydraulic connection is easier than with shaft 9 where one end is connected to the prime mover 50.

Figure 7:
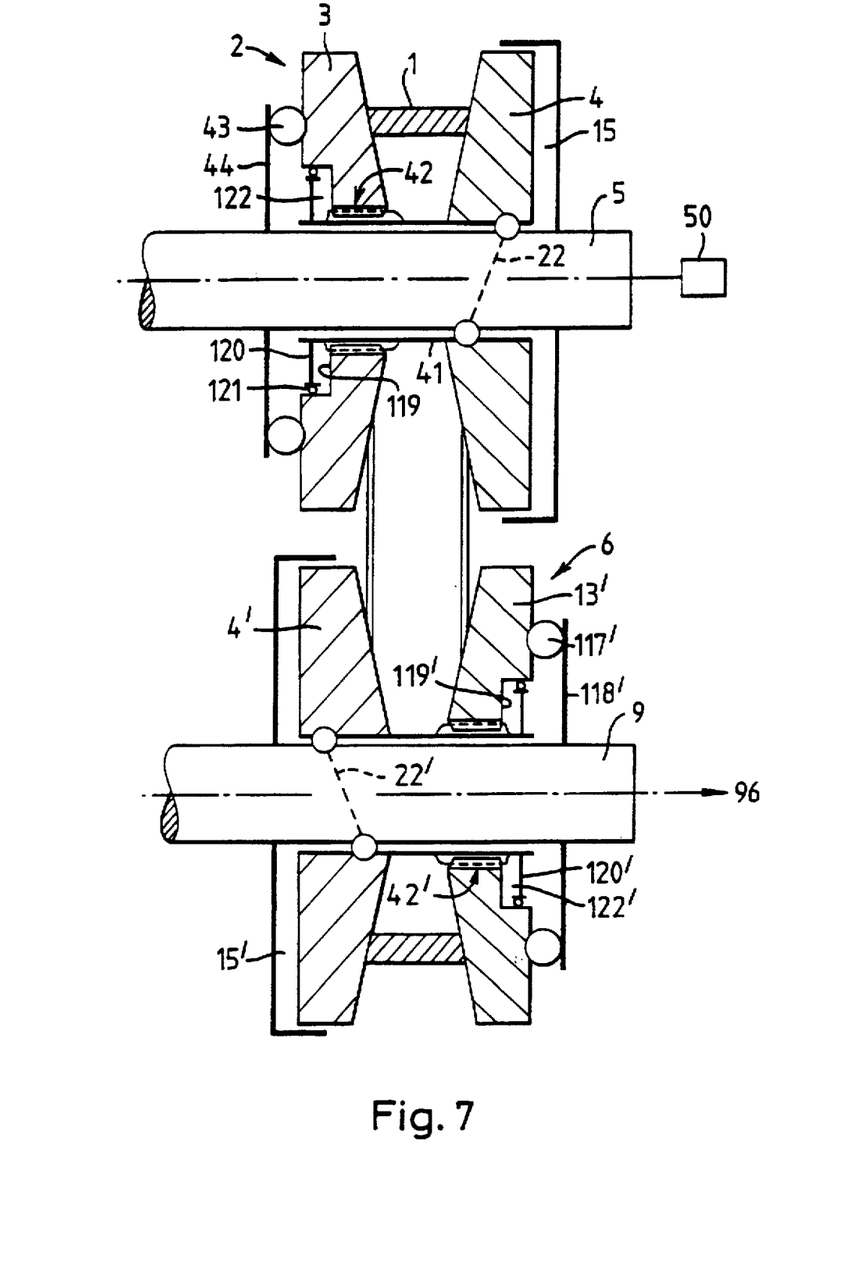
FIG. 7 is an axial section through another variator.
Figure 8:
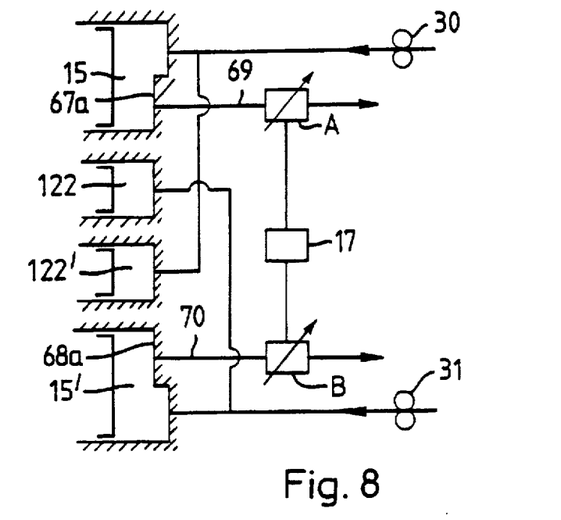
FIG. 8 shows the hydraulic circuit associated with the variator of FIG. 7.

In the example of FIGS. 7 and 8 a belt 1 transmits traction between pulley unit 2, mounted on shaft 5, and pulley unit 6 mounted on shaft 9. In this example shaft 5 is connected to prime mover 50 and shaft 9 will typically be connected by way of further components which are not shown and are no part of the present invention, to the final output gear 96 of the CVT of which the variator is a component. Pulley unit 2 includes a sheave 4, and a helical ball-race mounting 22 is interposed between this sheave and the shaft 5, so that sheave and shaft are capable of limited relative movement including both a rotary and an axial component. Sheave 4 is also mounted to move as a piston within a hydraulic cylinder 15 formed by a housing carried by shaft 5. Pulley unit 2 also comprises a second sheave 3 splined, at 42, to a collar 41 carried by the first sheave 4. Item 42 allows relative axial movement between parts 3 and 41, but is sealed against fluid escaping through the spline. A ball race 43, mounted on a radial flange 44 carried by shaft 5, allows sheave 3 to rotate about the shaft but prevents it from relative movement leftwards. Thus far the example of FIG. 7 is generally similar to the example of some previous FIGS. However the sheave 3 is also formed with a cutaway part 119 and a radial flange 120, mounted on collar 41, carries a seal 121. Parts 42, 41, 120, 121 and 119 co-operate to define a second hydraulic cylinder 122.

The arrangement of the other pulley unit 6 on output shaft 9 is similar but reversed left-to-right, and the corresponding components are indicated by the same numerical reference but with an index', e.g. first and second sheaves 4' and 3'. The hands of the two ball races 22 and 22' are such that, when power flows from shaft 5 to shaft 9, the hand of the ball race 22 tends to generate a force acting to separate—that is to say, move axially apart—the sheaves on shaft 5 while the hand of ball race 22' tends to generate a force acting to move together the sheaves on shaft 9. If the power flow is reversed, the forces are also reversed. The straight splines 42 and 42' permit such movement, but prevent relative rotary movement between the two sheaves.

Figure 11:
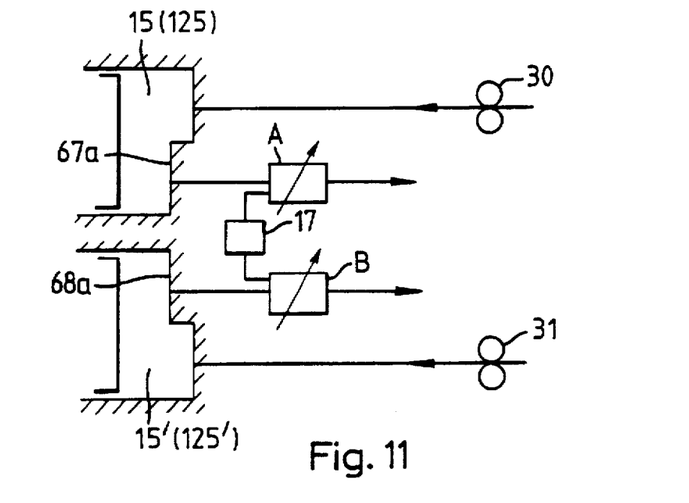
FIG. 11 shows a hydraulic circuit associated with the variators of FIGS. 9 and 10.

In the control circuits shown in FIGS. 8 and 11, pumps 30 and 31 and a central control unit 17 are provided, and valves A and B regulate pressures to the cylinders urging the sheaves together. These pressures are computed so that the normal load on the belt (or chain) is sufficient to prevent slippage but is not excessive and so that torque-dependent axial forces from the ball screws are balanced algebraically. The normal load is primarily a function of the usable coefficient of friction between the belt and the sheave and the sum of the input and output torques. The latter can be expressed as a function of the torque being controlled, which is therefore known, and the variator speed ratio (which can easily be measured). Thus the optimum normal load (clamping force) can be maintained over the whole operating range.

Should the sheaves, for any reason, overshoot their normal operating range a 'hydraulic stop', well understood in the art, will come into effect. In a manner similar to that shown in FIG. 5, outlet lines 69, 70 from the two cylinders 15 and 15' are mounted in steps 67a, 68a which lie axially-proud of the parts of the end walls where the inlet lines enter the cylinders from pumps 30, 31 respectively. As the sheave approaches one of the steps 67a or 68a, before actually touching that step it obstructs the outlet port and so tends to raise the resistance in the respective fluid line, so resisting further movement of the sheave by raising the fluid pressure in the cylinder above the value it would have were that value determined solely by the respective control valve A or B.

As FIG. 8 clearly shows, the separate hydraulic cylinders 15, 122; 15', 122' of the example of FIGS. 7 and 8 allow each power source (30 and 31) to be connected directly both to the "large" or "torque-dependent" cylinder (15 and 15') of one pulley unit, and to the "small" or "clamping" cylinder (122' and 122) of the other unit. It should also be noted that it will still be desirable for the normal load on the belt to be high enough to prevent slippage, especially when the hydraulic stop raises pressure to counteract an overload torque in the variator. To ensure that this is so, the helix angles of the ball screws must be above a certain value determined by the parameters of the variator, in particular the usable friction coefficient and, in the case of FIG. 8, the areas of the large and small pistons.

Figure 9:
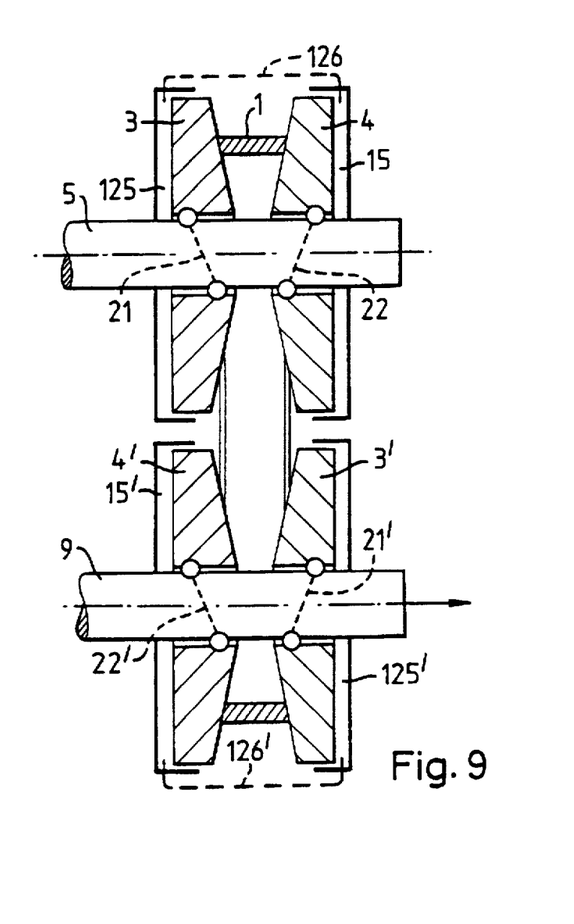
FIGS. 9 and 10 are similar to FIG. 7 but show further variators.
Figure 10:
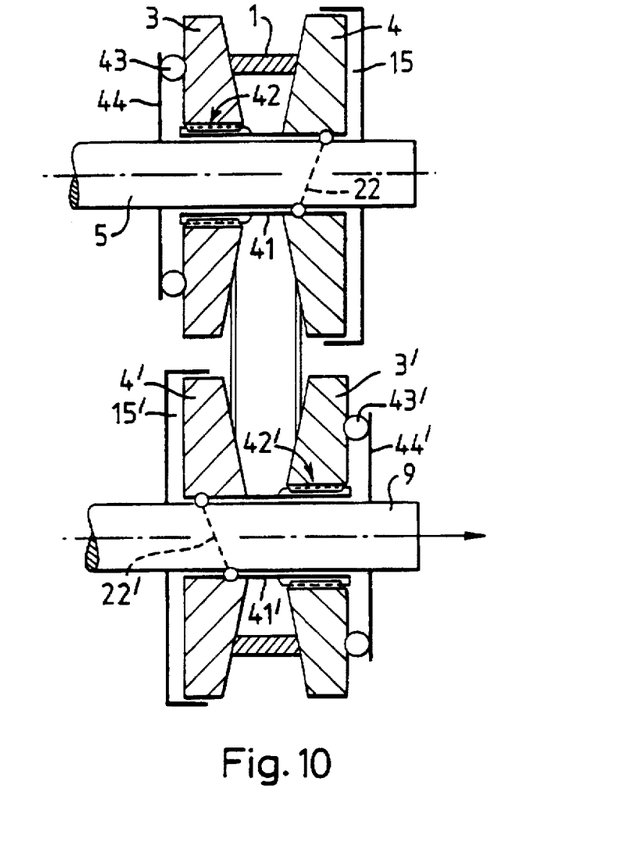

In the embodiments of FIGS. 9 and 10, reference numerals already used in FIG. 7 continue to denote similar components. In FIG. 9, however, instead of only one sheave (4, 4') of each pulley unit being mounted on a helical ball race (22, 22') now the second sheave (3, 3') in each unit is also mounted (as for unit 2 in FIG. 2) on a similar ball race (21, 21'), the two ball races of each unit being of opposite hands. Furthermore, the cylinders 122, 122' of FIG. 7 are omitted and the two sheaves of each unit are identical in outline, the sheaves 3 and 3' acting as pistons within similar housings carried by shafts 5 and 9, the resulting cylinders 15 and 125, 15' and 125' being in hydraulic communication as indicated at 126 and 126'. In the variator of FIG. 10 the similarity with FIG. 7 is even closer, the only significant difference being that the cylinders 12' and 122' are omitted. The sheaves 3 and 3' of each unit are therefore of simpler shape but still run on the splines 42 and 42' mounted on the collars 41, 41' carried by the sheaves 4 and 4', and are still held against axial movement in the reverse direction by ball races 43 and 43'. In the embodiment of FIG. 10, therefore, the only means by which axial hydraulic force is applied to each of the pulley units is by way of the cylinders 15, 15' upon the sheaves 4 and 4'. For each of the embodiments shown in FIGS. 9 and 10, FIG. 11 shows the essential components of the hydraulic circuit, comprising, as for FIG. 7, the central programmed control unit 17, the two pumps 30 and 31, and the two control valves A and B. Pump 30 and valve A are in circuit with cylinder 15 (and, for FIG. 9, cylinder 15' by way of connection 126) of one pulley unit, and pump 31 and valve B are in circuit with cylinder 15'(and, for FIG. 9, cylinder 125' by way of connection 126') of the other pulley unit. Although for simplicity not so shown in FIGS. 9 and 10, the cylinders 15 and 15' may as shown in FIG. 11 be formed with stepped ends 67a and 68a to facilitate the generation of "end-stop" effects as already described with reference to FIG. 8.

Figure 12:
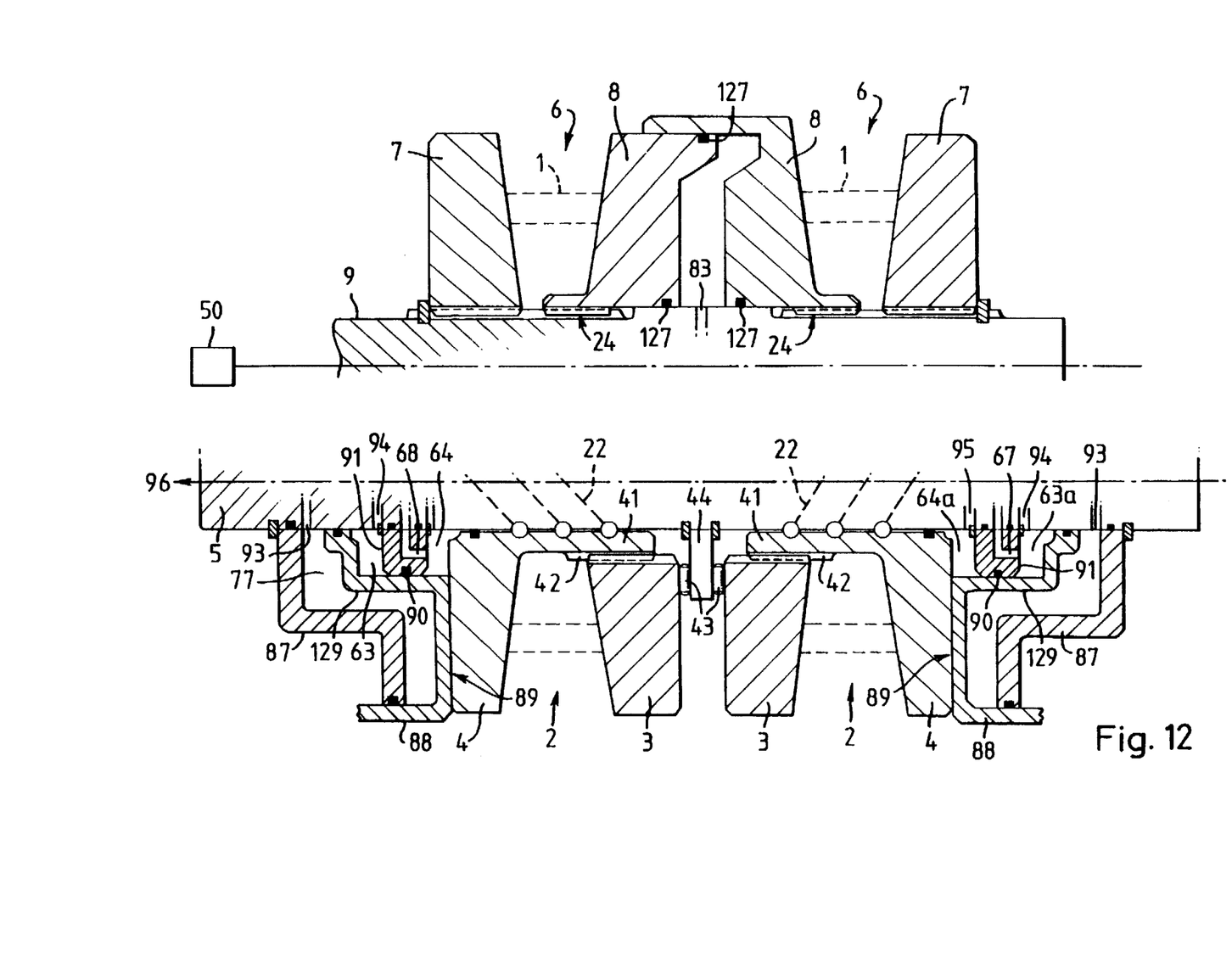
FIG. 12 is an axial section through a further variator.

FIG. 12 shows an embodiment of the second aspect of the present invention in which a torque-controlled variator, generally of the kind illustrated in FIG. 6, is easily and economically adapted so as to permit more than one combination of two pulley units and belt to be mounted in parallel, on common input and output shaft so as to equalise the torques on all individual belts but enhance the total torque that can be applied to the variator and thus the total traction it can transmit. While FIG. 6 shows a two-belt variator, it will be appreciated that the principle could also be applied to a variator with more than two belts. As will be apparent from the description that follows, in the variator of FIG. 12 the ways in which the pulley units are mounted on the input and output shafts are dissimilar: the ball-race mountings are confined to the output shaft. Thus the symmetry of FIG. 7 is not present, and therefore a hydraulic circuit comparable to that of FIG. 8 cannot be used.

In FIG. 12 shaft 9, driven as in FIG. 6 by prime mover 50, drives two belts 1 by way of two pulley units 6. The outer sheaves 7 of these two units are fixed to shaft 9, while the inner sheaves 8 engage with the shaft by way of straight splines 24 and are therefore capable of limited axial movement. A variable-capacity hydraulic cylinder 76 is defined between the sheaves 8 and the shaft 9, and is sealed by ring seals 127.

Belts 1 engage with pulley units 2 on the other shaft 5, which is connected as before to the final drive 96. The outer sheaves 4 of these pulley units are mounted on shaft 5 by way of helical ball races 22 and are formed with collar-like extensions 41, on which the inner sheaves 3 are mounted on straight splines 42. The inner sheaves 3 are prevented from approaching one another by ball or roller races 43 mounted on opposite faces of a flange 44 carried by shaft 5. Outer sheaves 4 are each fixed to a shaped ring 89, which makes a sealed sliding fit with shaft 5 at 90. Further shaped rings 87, which make a fixed and sealed fit to shaft 5 at their inner rims, make a sealed but sliding fit at their outer rims against outer flanges 88 of the rings 89. Sealed and variable-capacity hydraulic cylinders 77, formed with inlet ports 93, are therefore defined between rings 89 and 87. Annular structures 91 make a sealed fit at their inner radii against shaft 5, and at their outer radii make a sliding fit against inner flanges 129 of rings 89. The blocks and adjacent components thus define sealed hydraulic cylinders 63 and 64, 64a and 63a of reciprocally-varying capacity. Cylinders 63 and 63a have fluid inlet ports 94 formed in shaft 5, cylinders 64 and 64a have similar inlet ports 95, and structures 91 are formed with outlet conduits 68 and 67 in communication with cylinders 64 and 63a respectively.

Appropriate associated hydraulic circuitry is essentially shown in FIG. 5. By means of conduits (not shown) formed within shaft 5 pump 30 delivers fluid to cylinders 63 (and 63a) by way of inlets 94, pump 31 delivers fluid to cylinders 64 (and 64a) by way of inlets 95, and the outlet conduits 67, 68 from the cylinders are connected to drain 38 by way of control valves A, B respectively. As in FIG. 8, but with a differently pre-programmed logic, valves A and B are regulated by the central programmed electronic control unit 17 of the CVT so that the resultants of the forces generated by the pressures in cylinders 63 and 63a, or in cylinders 64 and 64a, are equal and each represent the "torque-dependent" component of the total axial end-load force exerted upon each of the pulley units 2. By means of valve 73 (which selects the higher of two pressures to transmit) and the third controlled valve 75, one or other of pumps 30 and 31 is also connected to cylinders 76 and 77 to exert the appropriate belt-sheave clamping force on pulley units 6, and the clamping component of the total axial end load on pulley units 2. It will be appreciated that the clamping forces on the two shafts are the same, and are provided by the same pressure in cylinders of equal area, and that there is no net force from the "torque control" cylinders 63 and 64, 64a and 63a because the pressures are balanced by the forces from the helical ball races 22.

It will be noticed that the input shaft 9 need contain only one hydraulic conduit to feed fluid from valve 75 to cylinder 76 by way of an inlet 83, whereas many more hydraulic conduits will have to be carried within the output shaft 5 to supply the many ports and conduits shown. This will typically be advantageous because both ends of shaft 5 are potentially unobstructed, making access for hydraulic connections easier than with shaft 9 where one end is connected to the prime mover 50.

We claim:

1. A continuously-variable-ratio transmission ("CVT") of a band-and-sheave type including control means (17) operable (via 18) by a driver or other operator, a ratio-varying component ("variator") comprising at least one band (1) in driving contact with two pulley units (2, 6) presenting parallel but separated axes of rotation but sharing a substantially common radial plane, in which each pulley unit comprises shaft means (5, 9) and two sheaves (3, 4; 7, 8) mounted thereon, axial separation of the sheaves being variable whereby to alter radius of contact between the band and an associated pulley unit and so alter transmitted ratio, in which there is a torque-sensitive connection (21, 22) between at least one of the pulley units and its shaft means capable of generating an axial unit/shaft means force that is a function of a magnitude and direction of a torque a pulley unit is transmitting, and in which loading means (30, 15, 25, 36, 39; 31, 16, 26, 37, 39) operate on the pulley units to urge their sheaves together with a loading force characterized in that the torque sensitive connection comprises a power transmitting connection and the input of power to the variator by way of a shaft means on either of the two axes has the effect, by way of the torque-sensitive connection, of tending to cause the axial separation of the sheaves of a unit on that shaft means to increase relative to that of the sheaves of a corresponding unit on the other shaft means.

2. A CVT according to claim 1 in which the torque-sensitive connection permits relative movement between sheaves and shaft means which includes both an axial and a rotary component.

3. A CVT according to claim 2 in which the torque-sensitive connection includes a component that follows a generally helical locus.

4. A CVT according to claim 3 in which the torque-sensitive connection is of ball screw type.

5. A CVT according to claim 1 in which the two sheaves of a pulley unit are connected so that they rotate together but are capable of limited relative axial movement.

6. A CVT according to claim 1 in which both sheaves of a pulley unit are mounted for both axial and rotary torque-responsive movement relative to their shaft means, and to execute such movements in mirror image to each other, whereby change of their radius of contact with the band takes place without change to an axial location of that band.

7. A CVT according to claim 1 in which the loading force is generated hydraulically.

8. A CVT according to claim 1 including means, responsive to an axial approach or separation of the two sheaves of a pulley unit beyond predetermined limits, to counteract that approach or separation by respectively raising or diminishing an axial load that is causing it.

9. A CVT according to claim 1 including mechanical means to prevent the band from running off an inner radii of the sheaves of a pulley unit, should the sheaves separate too far axially.

10. A CVT according to claim 9 in which the mechanical means take the form of a ring located between the sheaves and rotatably mounted on the shaft means of the pulley unit.

11. A CVT according to claim 1 in which the band is of belt-like type.

12. A CVT according to claim 1 in which the band is of chain-like type.

13. A CVT according to claim 1 adapted to operate in at least two regimes, in at least one of which power recirculates through the variator and a "geared neutral" ratio is achieved.

14. A CVT according to claim 1 in which the loading force includes first and second components related to sheave-band reaction ("clamping") and torque at the pulley unit respectively.

15. A CVT according to claim 14 in which the magnitude of the second component of the loading force is a function of operator demand.

16. A CVT according to claim 15 in which the magnitude of the first component of the loading force is also a function of operator demand.

17. A CVT according to claim 14 in which the variator ratio reaches an equilibrium value when the axial unit/shaft means force is equal to the second component of the loading force and is applied to a pulley unit in opposition to the loading force.

18. A CVT according to claim 7 in which the means for generating at least part of a loading force on at least two pulley units are connected so that they are at equal pressure and a rise or fall of the volume of hydraulic fluid within one of them is matched by a corresponding fall or rise within the other.

19. A CVT according to claim 1 including a prime mover connected to one of the variator axes, and in which any of the torque-sensitive connections are confirmed to the second variator axis.

20. A CVT according to claim 19 in which a loading force exerted on any pulley units on the second axis of the variator are generated using hydraulic devices mounted on that axis, and in which fluid conduits associated with those devices are formed within the shaft means on that axis and extend away from their respective devices within that shaft means in both axial directions.

21. A CVT according to claim 13 including a driven shaft and gearing and clutch means operable to enable the CVT to operate in more than one "regime", in which the driven shaft is displaced from either of the axes of rotation of the variator, and the gearing and clutch means are mounted coaxially with the driven shaft.

22. A CVT according to claim 1 in which traction is transmitted between the two axes by more than one belt, and means are provided to equalise the torques on all the belts.

23. A CVT according to claim 14 in which separate power sources are used to generate loading forces for pulley units on the two variator axes, the first such source contributing the first component for at least one unit aligned with the first variator axis and the second component for at least one unit aligned with the second variator axis, and vice versa for the second source.

24. A continuously-variable-ratio transmission ("CVT") of a band-and-sheave type including control mechanism (17) operable (via 18) by a driver or other operator, a ratio-varying component ("variator") comprising at least one band (1) in driving contact with two pulley units (2, 6) presenting parallel but separated axes of rotation but sharing a substantially common radial plane, in which each pulley unit comprises shaft mechanism (5, 9) and two sheaves (3,4; 7,8) mounted thereon, axial separation of the sheaves being variable whereby to alter a radius of contact between the band and an associated pulley unit and so alter a transmitted ratio, in which there is a torque-sensitive connection (21, 22) between at least one of the pulley units and its shaft mechanism capable of generating an axial unit/shaft mechanism force that is a function of a magnitude and direction of a torque a pulley unit is transmitting, and in which loading mechanism (30, 15, 25, 36, 39; 31, 16, 26, 37, 39) operate on the pulley units to urge their sheaves together with a loading force characterised in that the torque sensitive connection comprises a power transmitting connection and the input of power to the variator by way of a shaft mechanism on either of the two axes has the effect, by way of the torque-sensitive connection, of tending to cause the axial separation of the sheaves of a unit on that shaft mechanism to increase relative to that of the sheaves of a corresponding unit on the other shaft mechanism.

* * * * *

UNITED STATES PATENT AND TRADEMARK OFFICE
CERTIFICATE OF CORRECTION

PATENT NO.   : 5,766,105
DATED        : June 16, 1998
INVENTOR(S)  : Fellows, et al It is certified that error appears in the above-identified patent and that said Letters Patent is hereby corrected as shown below:

On the title page, item [56], insert the following:

| U.S. PATENT DOCUMENTS | | | | |
|---|---|---|---|---|
| Document Number | Date | Name | Sub-Class | class |
| 3,868,862 | | | | |

| FOREIGN PATENT DOCUMENTS | | | | |
|---|---|---|---|---|
| Document Number | Date | Country | Sub-Class | class |
| 1270712 | 4-12-72 | GREAT BRITAIN | | |

Signed and Sealed this

Seventeenth Day of November, 1998

Attest:

BRUCE LEHMAN

*Attesting Officer*          *Commissioner of Patents and Trademarks*